United States Patent [19]
Klein

[11] Patent Number: 5,550,473
[45] Date of Patent: Aug. 27, 1996

[54] METHOD FOR LOCATING THIN BED HYDROCARBON RESERVES UTILIZING ELECTRICAL ANISOTROPY

[75] Inventor: James D. Klein, Lucas, Tex.

[73] Assignee: Atlantic Richfield Company, Los Angeles, Calif.

[21] Appl. No.: 412,683

[22] Filed: Mar. 29, 1995

[51] Int. Cl.$^6$ .................................................. G01V 3/30
[52] U.S. Cl. .......................................................... 324/338
[58] Field of Search .................................. 324/338, 339, 324/340, 341, 342, 343

[56] References Cited

U.S. PATENT DOCUMENTS

| | | |
|---|---|---|
| 4,940,943 | 7/1990 | Bartel et al. . |
| 5,171,460 | 12/1992 | Underdown . |
| 5,285,848 | 2/1994 | Chang . |

OTHER PUBLICATIONS

J. D. Klein, P. R. Martin and D. F. Allen, *The Petrophysics of Electrically Anisotropic Reservoirs*, pp. 1–12 SPWLA 36th Annual Logging Symposium Jun. 1995.
Teruhiko Hagiwara, *Response of 2 MHz Resistivity Devices In Thinly Laminated Formations (Anisotropic Resisitivity and EM Log Interpretation)*, pp. 667–676 SPWLA Symposium Jun. 1990.
J. D. Klein, *Saturation Effects On Electrical Anisotrophy*, Mar. 15, 1995.
James D. Klein, *Induction Log Anisotropy Corrections*, Mar.–Apr. 1993, pp. 18–27, The Log Analyst.
Michael S. Bittar and Paul F. Rodney, *The Effects Of Rock Anisotropy On MWD Electromagnetic Wave Resistivity Sensors*, Jun. 19–22, 1994, pp. 1–18, SPWLA Symposium.
D. F. Allen, *Laminated Sand Analysis*, Jun. 10–13, 1994, pp. 1–20, SPWLA Symposium.
Arne Fylling, *Estimating Conductivity And Saturations In The Sands Of Thinly Laminated, Dipping Sand/Shale Sequences*, Jun. 16–19, 1991, pp. 1–25, SPWLA Symposium.
Barbara Anderson, Stephen Bonner, Martin G. Luling & Richard Rosthal, *Response Of 2–MHz LWD Resistivity and Wireline Induction Tools In Dipping Beds And Laminated Formations*, Jun. 24–27, 1990 pp. 1–25, SPWLA Symposium.

*Primary Examiner*—Walter E. Snow
*Attorney, Agent, or Firm*—F. Lindsey Scott

[57] ABSTRACT

A method of locating thin bed hydrocarbon reserves in laminated subterranean formations comprising thin beds. The method comprised of drilling a well penetrating the subterranean formations, measuring the parallel and perpendicular resistivity across multiple thin beds, and locating regions of the thin beds where the perpendicular resistivity is substantially greater than the parallel resistivity.

13 Claims, 1 Drawing Sheet

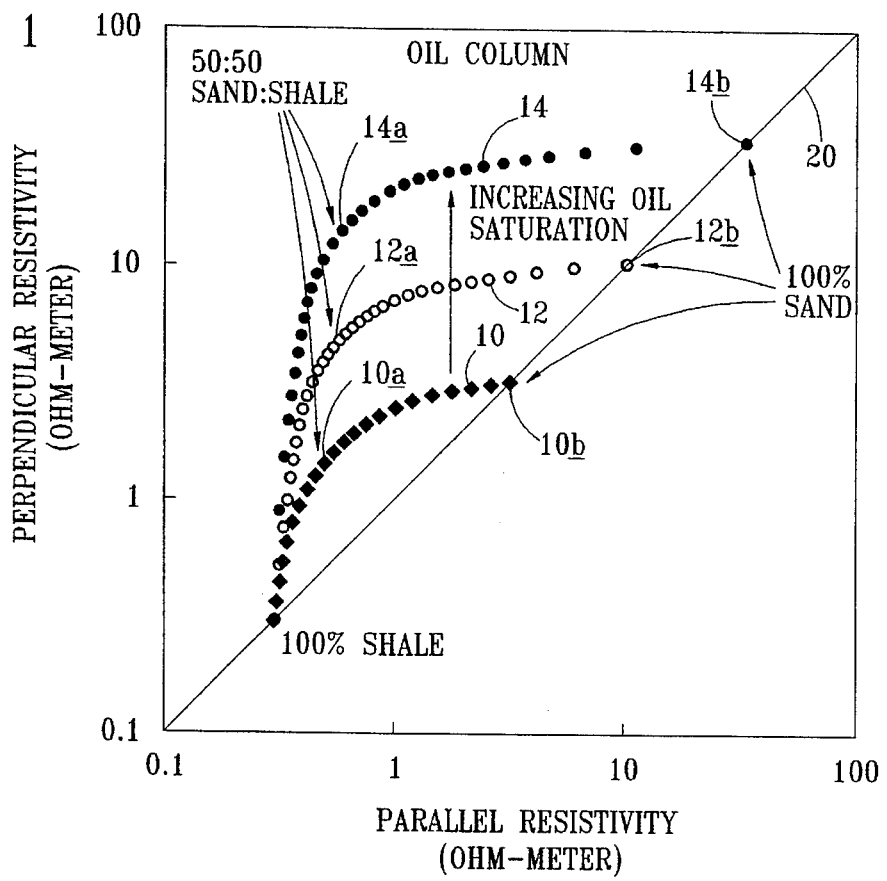
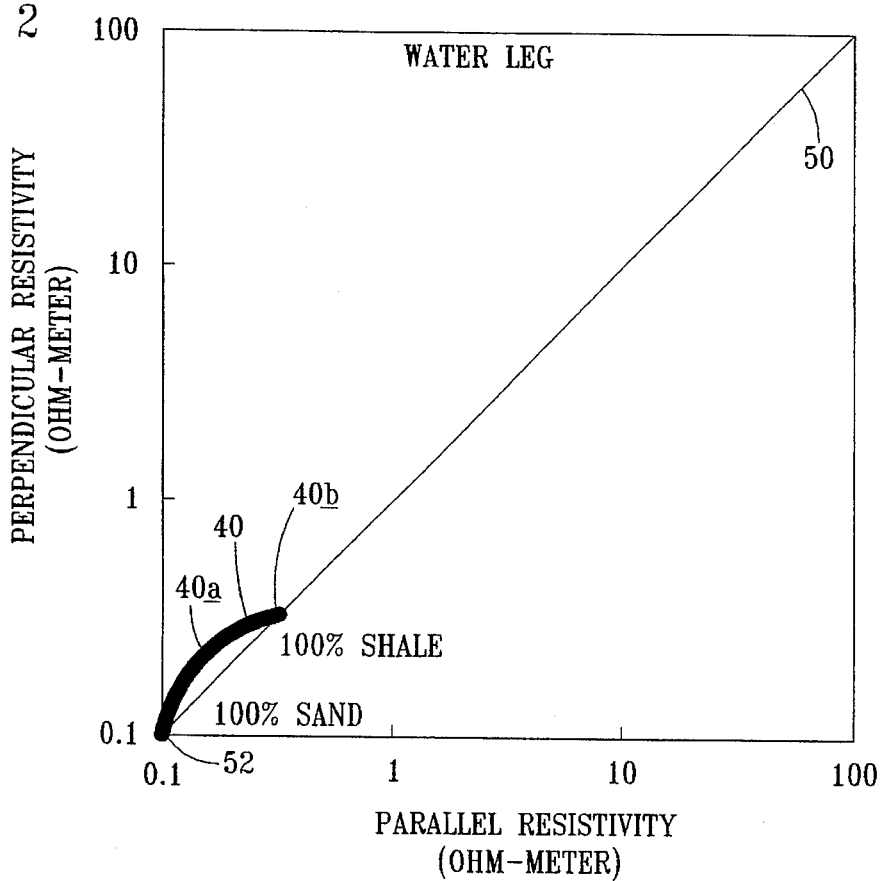

METHOD FOR LOCATING THIN BED HYDROCARBON RESERVES UTILIZING ELECTRICAL ANISOTROPY

TECHNICAL FIELD

The invention relates to a method for the location of thin bed hydrocarbon reserves in subterranean formations.

BACKGROUND OF THE INVENTION

Since the discovery of useful applications for hydrocarbon substances there has been continuing exploration and development efforts to locate subterranean hydrocarbon deposits. These exploration and development efforts have resulted in the exhaustion of many hydrocarbon deposits and has caused an ever escalating effort to locate and exploit deposits which heretofore were difficult to discover or uneconomical to exploit. One example of such deposits are thin bed hydrocarbon deposits. Thin bed hydrocarbon deposits, some of which may be as thin as six (6) inches wide, can be the source of economical quantities of hydrocarbons especially when multiple thin bed deposits occur in the same formation or in a formation which also includes other hydrocarbon deposits. Unfortunately thin bed deposits have been and continue to be difficult to locate even when a well is drilled through the thin bed deposit. By failing to recognize such thin bed deposits producers have abandoned wells which may have proved productive, and have failed to explore in areas that may contain thinly-bedded hydrocarbon deposits because of the difficulty in locating such thin bed deposits and the economic risk of drilling dry holes.

In an effort to locate the presence of hydrocarbons in subterranean formations, a number of methods have been used. One method used in an attempt to locate thin bed hydrocarbon deposits is to insert a high vertical resolution logging tool into the well after it is drilled, and which is capable of measuring the electrical properties of geological formations with the resolution of a few inches. Unfortunately, it is uneconomical to utilize high vertical resolution logging tools unless the producer is aware of the presence of thinly-bedded formations. Another method currently used is to drill wells utilizing Measurement While Drilling (MWD) tools which are capable of evaluating characteristics of geological formations as the drilling is conducted. One class of MWD tools which is commonly used to locate hydrocarbon reserves, but has not been utilized heretofore to locate thinly-bedded reserves, is the Electro-Magnetic (EM) logging tools which also measure certain electrical characteristics of geologic formations, but with a much wider resolution. U.S. Pat. No. 4,940,943 entitled "Method and Apparatus for Optimizing the Reception Pattern of the Antenna of a Propagating Electromagnetic Wave Logging Tool" issued Jul. 10, 1990 to R. Bartel and P. Rodney discloses one such EM logging tool.

Another such EM tool is an MWD induction logging sensor. This device consists of at least one transmitting and two receiving antennas mounted on a drill collar. Electromagnetic waves propagate outward front the transmitting antenna and the phase difference and amplitude ratio of the induced voltages at the receiving antennas are measured. This data allows the calculation of the geological formation's resistivity. Because hydrocarbons have a relatively high resistivity when compared to other substances, including water and shale, areas of high resistivity in geological formations may indicate the presence of hydrocarbon deposits.

One of the physical properties sometimes seen by EM logging tools is a property called electrical anisotropy (an anisotropic medium has different physical properties when measured in different directions). Electrical anisotropy is the property where a material produces different resistivities when measured in different directions relative to the geological formation, generally parallel and perpendicular to laminated geological formations. It has been discovered that one source of electrical anisotropy shown by EM logging tools originates from the measurement across multiple alternating thin subterranean beds or laminations of different resistivity. This results from the fact that current flowing perpendicular to the bedding must pass through the more resistive layers in the sequence and therefore experiences greater resistance compared to current flowing parallel to the bedding which concentrates in the more conductive beds. This anisotropic behavior is termed macroscopic anisotropy, because it results from a measurement across a sequence of laminated beds. Microscopic anisotropy, on the other hand, is where individual beds exhibit anisotropic behavior.

Anisotropy is infrequently seen in vertical drilling because standard EM logging tools have been designed to measure the parallel resistivity of formations when the formations lie perpendicular to the well (horizontal). In many instances diverted wells are used to extend the area of a formation which can be produced from a single well pad, platform or the like. Such wells may be and frequently are drilled at a slight angle (0°–25°) to the formation to result in positioning the well to end at a desired location or to provide a length of the wellbore in a formation of interest. Therefore, when individual layers are neither delineated nor resolved by a logging tool and the well bore is at a deviated angle to a formation, the tool responds to the formation as if it were a macroscopically anisotropic formation; in other words, when the bedding is much thinner than the tool resolution, the tool sees the structure as a homogeneous but macroscopically anisotropic formation. The 2 MHz induction logging tool has been shown to have particular abilities to measure the anisotropy of geologic formations in such wells. An article "Response of 2 MHz Resistivity Devices in Thinly Laminated Formations (Anisotropic Resistivity and EM Log Interpretation)" by T. Hagiwara, SPE 28426, presented at the 69th Annual Technical Conference on Sep. 25–28, 1994, provides a detailed description of this response. Other EM logging tools such as electric resistivity tools and toroidal resistivity tools are also able to detect anisotropic resistivity.

As a result of recent advances in drilling technology, hydrocarbon exploration wells are being drilled utilizing directional drilling techniques and MWD sensors to evaluate geological formations. Many current wells are being drilled horizontally or at a high deviation angle from traditional vertical wells. This non-vertical drilling may allow a number of wells to be drilled from a single on-shore or offshore location into a long pay (hydrocarbon rich) zone which can result in greater hydrocarbon extraction. One of the side effects of non-vertical drilling has been a greater observation of anisotropic effects in logging data particularly in wells that are drilled between 0° and 25° from the plane of the formation.

Producers generally utilize a resistivity logging analysis to detect the presence of hydrocarbons which was developed in connection with drilling traditional vertical wells. Because of the construction of various EM logging tools, the measured resistivity of geological formations in vertical wells principally measures parallel resistivity. Since anisotropy results in different measurements for parallel and perpendicular resistivity of anisotropic geological formations, measurements in deviated wells have shown measured resistances which were higher than expected from vertical well data. As a result, manufacturers of EM logging tools have attempted, and continue to attempt, to correct logging data to remove the presence of anisotropy in logging data.

While an article "Response of 2 MHz Resistivity Devices in Thinly Laminated Formations (Anisotropic Resistivity and EM Log Interpretation)" by T. Hagiwara, SPE 28426, presented at the 69th Annual Technical Conference, SPE, Sep. 25–28, 1994 discloses the utilization of anisotropy to determine sand lamina resistivity and net/gross ratio (the sand thickness to total formation thickness) in a sand/shale sequence, anisotropic data is still considered something that should be corrected for instead of utilized.

Since the recovery of hydrocarbons from thin bed reserves may prove to be the source of economical quantities of hydrocarbons and may result in fewer dry holes, a continuing search has been directed to the development of economical means to identify thin bed hydrocarbon reserves in subterranean formations.

SUMMARY OF THE INVENTION

According to the present invention, the location of thin bed hydrocarbon reserves in laminated subterranean formations comprising thin beds is accomplished by a method comprising drilling a well penetrating the subterranean formations, measuring the parallel and perpendicular resistivity across multiple thin beds, and locating regions of porous thin beds where the perpendicular resistivity is substantially greater than the parallel resistivity.

BRIEF DESCRIPTION OF THE DRAWINGS

FIG. 1 shows a graph plotting perpendicular resistivity versus parallel resistivity for a thinly-bedded sand-shale oil formation where the relative proportion of sand varies from 0% to 100%.

FIG. 2 shows a graph plotting perpendicular resistivity versus parallel resistivity for a second thinly-bedded sand-shale water formation where the relative proportion of sand varies from 0% to 100%.

DESCRIPTION OF THE PREFERRED EMBODIMENT

According to the present invention, a 2 MHz Measurement While Drilling (MWD) induction logging tool having at least one transmitting and two receiving antennas is mounted on a drill collar such that it is capable of measuring the parallel (parallel to the plane of the formation) and perpendicular (perpendicular to the plane of the formation) resistivities of the formation through which it passes while drilling is conducted. The transmitter-receiver spacing of the logging tool is chosen such that electro-magnetic data measurements are taken across at least two thin beds in the subterranean formation in order to detect the presence of macroscopic anisotropy. It is understood that while a 2 MHz induction logging tool is preferred, any device that is capable of recording the perpendicular and parallel resistivities and having a resolution greater than the width of the beds may be utilized.

The drill collar is attached as part of the bottom hole assembly such that the induction logging tool is as close to the drill bit as is possible, preferably not more than 100 feet away from the drill bit. A well is then drilled utilizing the drill collar which contains the 2 MHz induction logging tool. As the well is drilled the borehole is directed at a deviated angle relative to the bedding. Preferably, the borehole deviation angle should be between 0° and 25° relative to the formation (where 0° is parallel to the formation). In thin beds laying parallel to the surface, the well is drilled in such thin beds between 65° and 90° relative to vertical. It is understood that the need for such well deviation angle is required in order to increase the anisotropic effect measured by the 2 MHz induction tool.

As the well is drilled the 2 MHz induction tool records the parallel and perpendicular resistivities of the formation through which the tool passes. When the tool is positioned at an angle as discussed above, the induced current flowing perpendicular to the thin beds must pass through each thin bed in the sequence within a distance of the tool equal to the transmitter—receiver spacing and therefore experiences greater resistance compared to current flowing parallel to the thin beds, which concentrates in the more conductive thin beds. The degree of anisotropy depends on the difference in resistivity parallel to and perpendicular to the formation. Accordingly, since hydrocarbon bearing thin beds have a relatively higher resistivity than shale, water (which often saturates porous geologic formations) and other porous non hydrocarbon-bearing formations, thin bed hydrocarbon formations have a high resistivity and the measurements of electrical properties of the formation in the area of the hydrocarbon bearing thin bed wells exhibit a high degree of anisotropy. Based on common subterranean formations, hydrocarbon bearing thin beds typically have a perpendicular resistivity that is at least twice the parallel resistivity. FIGS. 1 and 2 are plots of parallel and perpendicular resistivities in various thinly-bedded formations.

FIG. 1 shows a graph plotting perpendicular resistivity versus parallel resistivity for a thin bed sand-shale oil formation where the relative proportion of sand varies from 0% to 100%. The curves 10, 12 and 14 represent measurements of sand formations having increasing amounts of oil saturation. If the formation through which the induction tool is passed is seen as a homogeneous material the parallel and perpendicular resistivities will be equal and a plot of the perpendicular versus parallel resistivity will fall on line 20 based on the amount of oil saturation. As shown, point 22 represents the point where parallel and perpendicular resistivities are equal in a homogeneous shale formation of relatively low resistivity. However, since sand formations are relatively porous, oil is able to saturate the sand layers such that the resistivity of the sand layers are a function of the amount of oil present in that particular layer. As the amount of sand saturated with oil increases relative to the amount of shale the degree of anisotropy increases and reaches a maximum at points 10a, 12a and 14a where the sand/shale ratios are equal. This maximum degree of anisotropy results from the fact that where the amount of oil saturated sand and shale are equal, the perpendicular resistivity reflects the resistivity of the oil saturated sand layers while the parallel resistivity reflects the resistivity of the shale layers. As the amount of sand relative to shale increases from 1:1 to 100% oil saturated sand at points 10b, 12b and 14b along line 20 the degree of anisotropy decreases until the formation appears to be a homogeneous formation of sand saturated with oil.

FIG. 2 shows a graph with curve 40 plotting perpendicular resistivity versus parallel resistivity for a second thinly-bedded sand-shale water formation where the relative proportion of sand varies from 0% to 100%. Line 50 represents equal parallel and perpendicular resistivities. Curve 40 begins at point 52 in a homogeneous sand formation filled with water which indicates a negligible resistance. As the percentage of shale increases to 50% at point 40a the perpendicular resistance increases to reflect the shale resistivity, while the parallel resistivity reflects the resistivity of water saturated sand. As the percentage of shale increases to 100% at point 40b, where a homogenous formation of shale is present the parallel and perpendicular resistivities both reflect the resistivity of the shale formation. As shown, this formation also exhibits anisotropic effects although clearly not to the degree seen in connection with oil saturated sands in FIG. 1.

The above method of locating thinly-bedded hydrocarbon reserves has also been found to work particularly effectively where the geological formation consists of layers having variable porosity. This is based on the fact that the resistivity of a given layer is a function of the amount of water saturating that layer. Thus, in the presence of water, a formation having greater porosity will exhibit lower resistivity than a formation with lower porosity. Lower porosity hydrocarbon layers may have a higher relative proportion of water compared to higher porosity hydrocarbon layers, and therefore have a lower resistivity than the high porosity layers which contain relatively less water. Accordingly, the formation need not be laminated sand-shale formations seen in FIGS. 1 and 2 but could consist of sandstone with alternating thin beds with differing sorting or grain size, or any other formation with vertical variability in capillarity.

The porosity of the thin beds of the formation can be determined from cuttings, calculated from density, other logging data or the like, as known to those skilled in the art. The occurrence of high perpendicular resistivity in the regions of low parallel resistivity in areas of high porosity is a strong indication of the presence of hydrocarbons.

Accordingly, it is seen that by utilizing the above method to increase the observation of anisotropy, producers will be able to accurately locate the presence of thin bed hydrocarbon reserves utilizing standard logging tools and drilling methods.

The measurement of perpendicular and parallel resistance in a subterranean formation and the determination of porosity in a subterranean formation is considered to be well known to those skilled in the art. While such measurements have been discussed generally, no detailed discussion of such methods is deemed necessary.

Although an illustrative embodiment of the invention has been shown and described, modifications, changes, and substitutions are possible within the scope of the foregoing disclosure. For example, the method does not require the use of 2 MHz induction logging tool, drilling a deviated borehole, or logging data as the well is drilled, as long as the parallel and perpendicular resistivities are measurable across multiple layers in the geological formation. Accordingly, it is appropriate that the appended claims be construed broadly and in a manner consistent with the scope of the invention.

What is claimed is:

1. A method of locating thin bed hydrocarbon reserves in laminated subterranean formations comprising thin beds, the method comprising:

drilling a well penetrating said subterranean formations;

measuring the parallel and perpendicular resistivity across multiple thin beds; and locating regions of said thin beds where said perpendicular resistivity is substantially greater than said parallel resistivity.

2. The method of claim 1 wherein said perpendicular resistivity is at least twice said parallel resistivity.

3. The method of claim 1 wherein said measuring is conducted across at least 2 thin beds.

4. The method of claim 1 wherein said measuring is conducted simultaneously with said drilling.

5. The method of claim 4 wherein said measuring is conducted by instruments carried in a lower portion of drilling apparatus and near a drill bit.

6. A method of locating thin bed hydrocarbon reserves in laminated subterranean formations composed of multiple layers including thin bed microporous and macroporous layers, the method comprising:

drilling a well penetrating said subterranean formation;

locating the presence of said microporous and macroporous layers;

measuring the parallel and perpendicular resistivity across said multiple layers; and locating regions of said multiple layers where said perpendicular resistivity is substantially greater than said parallel resistivity.

7. The method of claim 6 wherein said perpendicular resistivity is at least twice said parallel resistivity.

8. The method of claim 6 wherein said measuring is conducted across at least 2 layers.

9. The method of claim 6 wherein said locating and said measuring are conducted simultaneously with said drilling.

10. A method of locating thin bed hydrocarbon reserves in a laminated subterranean formation comprising thin beds, utilizing a 2 MHz induction tool, the method comprising:

drilling a well penetrating said subterranean formations;

measuring the parallel and perpendicular resistivity across multiple thin beds; and locating regions of said thin beds where said perpendicular resistivity is substantially greater than said parallel resistivity.

11. The method of claim 10 wherein said perpendicular resistivity is at least twice said parallel resistivity.

12. The method of claim 10 wherein said well is drilled at an angle from about 0° to 25° relative to said formation.

13. The method of claim 10 wherein the porosity of at least a portion of said thin beds is determined to identify porous thin beds having a perpendicular resistivity substantially greater then their parallel resistivity.

* * * * *